(No Model.)
A. B. FARQUHAR & H. W. EISENHART.
HOLDER FOR SPRING HARROW TEETH.
No. 465,173. Patented Dec. 15, 1891.
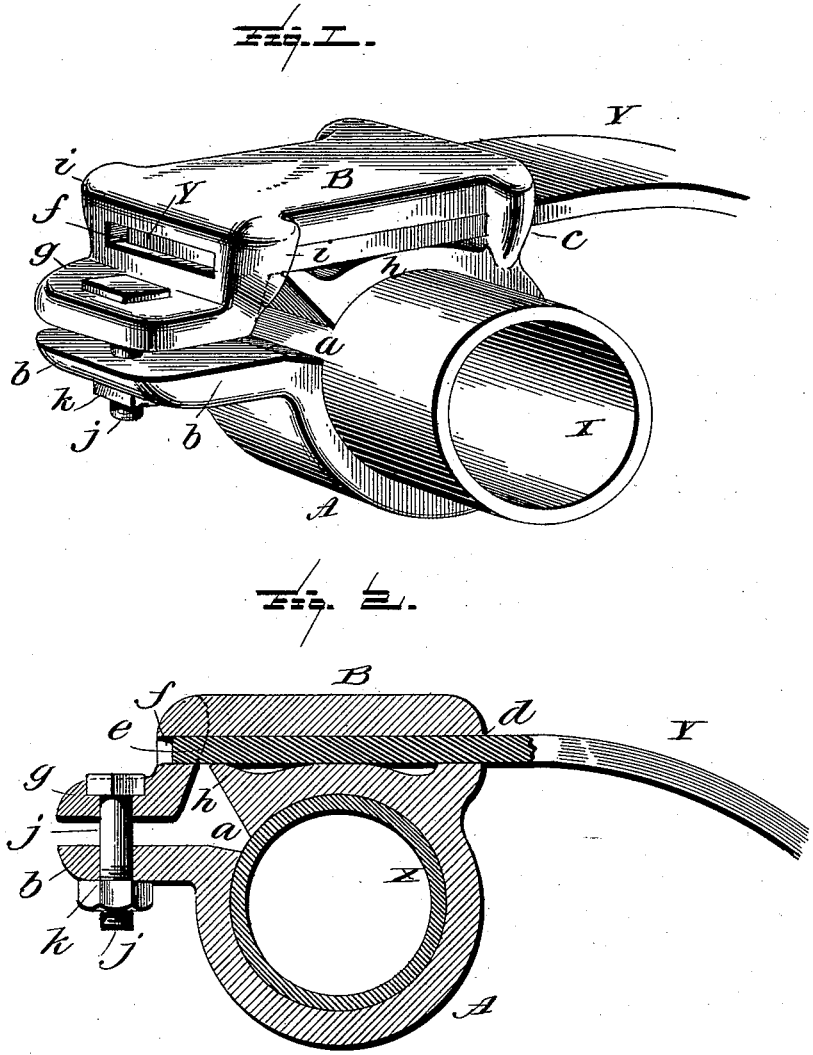

UNITED STATES PATENT OFFICE.

ARTHUR B. FARQUHAR AND HENRY W. EISENHART, OF YORK, PENNSYLVANIA; SAID EISENHART ASSIGNOR TO SAID FARQUHAR.

HOLDER FOR SPRING HARROW-TEETH.

SPECIFICATION forming part of Letters Patent No. 465,173, dated December 15, 1891.

Application filed November 5, 1891. Serial No. 410,963. (No model.)

*To all whom it may concern:*

Be it known that we, ARTHUR B. FARQUHAR and HENRY W. EISENHART, both of York, in the State of Pennsylvania, have invented a new and useful Improvement in Holders for Spring Harrow-Teeth, of which the following is a specification.

The holder in which our invention is comprised is one which is intended to serve both as a holder for the tooth and as a clamp by which the tooth may be secured in place in its adjusted position upon the gas-pipe or other cylindrical bearing-piece usually employed as the support for the same. The holder is one in which the tooth is fixed in place in the holder, and the holder itself is secured in place upon its cylindrical bearing by one and the same means and at one and the same time.

The nature of our improvement can best be explained and understood by reference to the accompanying drawings, in which—

Figure 1 is a perspective view, and Fig. 2 is a longitudinal vertical central section, of the holder.

The holder is made in a single casting, and preferably of malleable iron. It consists, generally speaking, of the split cylindrical portion or clamping-ring A, which is intended to encircle its cylindrical bearing or support, which in this instance is the tube or gas-pipe X and of the clamp-plate B. The clamping-ring A is split or divided at $a$, and it has on one of the edges bounding the slit a projecting lip or ear $b$. The clamp-plate B, which is cast in one piece with the ring, is joined to the latter at one end. At that point it rises vertically a short distance to afford a shoulder $c$ for a slot $d$ for the passage of the end of the harrow-tooth Y, and thence it extends horizontally back to the other side of the ring, where it has a corresponding shoulder $e$, in which may also be formed, if desired, a slot $f$ for the passage of the end of the tooth, and beyond this shoulder it has a horizontal lip or ear $g$, corresponding to the lip or ear $b$ on the ring. That portion of the ring A which faces plate B has formed on it a flat bearing-face for the end of the tooth, which bearing-face may consist of the three projecting ribs $h$, the bearing-faces of which are in the same plane. By providing the rear slot $f$ in the plate B we are enabled to slide the end of the tooth back and forth at will, so as to make its working length longer or shorter at pleasure. The slot $f$, however, can be dispensed with, if desired, in which event the end of the tooth would simply butt against a solid shoulder $e$. Side guide-lugs $i$ are provided to insure the end of the tooth against lateral play. A bolt $j$ is passed through the ears $g$ and $b$ (the head being seated in the ear $g$) and is secured by the nut $k$. By screwing up the nut the ears $gb$ are drawn together. This closes the plate B down upon the tooth Y and at the same time tightens and clamps the ring A upon its bearing or support X. In this simple way we are enabled at one and the same time and by the same operation to clamp the tooth in its holder and the holder itself upon its bearing or support. At the same time, by loosening the bolt, it is easy to adjust both the tooth in its holder and the holder upon its support.

Having now described our invention and the manner in which the same is or may be carried into effect, what we claim, and desire to secure by Letters Patent, is—

A holder for spring harrow-teeth, consisting of the split clamping-ring, the clamping-plate fast at one end to the ring and having between it and the ring a socket to receive the end of the tooth, and means for drawing together the free end of the clamp-plate and the opposite free end of the clamping-ring, whereby at one and the same operation the tooth may be clamped in its holder and the holder itself may be clamped or closed upon its support, substantially as and for the purposes hereinbefore set forth.

In testimony whereof we affix our signatures in presence of two witnesses.

ARTHUR B. FARQUHAR.
HENRY W. EISENHART.

Witnesses:
HERMAN STALLMAN,
JOHN W. BRANT.